US007069338B2

(12) United States Patent
Popovich et al.

(10) Patent No.: US 7,069,338 B2
(45) Date of Patent: Jun. 27, 2006

(54) REGIONAL REGISTRATION FOR A MOBILE IP ENABLED SYSTEM

(75) Inventors: George Popovich, Palatine, IL (US); Vidya Narayanan, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/802,159

(22) Filed: Mar. 17, 2004

(65) Prior Publication Data

US 2005/0114543 A1 May 26, 2005

Related U.S. Application Data

(60) Provisional application No. 60/525,544, filed on Nov. 26, 2003.

(51) Int. Cl.
*G06F 15/16* (2006.01)

(52) U.S. Cl. ............... 709/238; 709/245; 455/433; 455/435.1

(58) Field of Classification Search ............... 709/245, 709/217, 238; 370/402, 389, 349; 455/442, 455/433, 435.1
See application file for complete search history.

(56) References Cited

U.S. PATENT DOCUMENTS

| | | | |
|---|---|---|---|
| 2002/0045450 A1* | 4/2002 | Shimizu et al. ............... | 455/442 |
| 2002/0143993 A1* | 10/2002 | Jung ............................ | 709/245 |
| 2003/0101281 A1 | 5/2003 | Andrews et al. | |
| 2003/0193952 A1 | 10/2003 | O'Neill | |
| 2003/0223439 A1* | 12/2003 | O'Neill ....................... | 370/402 |
| 2004/0047348 A1* | 3/2004 | O'Neill ....................... | 370/389 |
| 2004/0105420 A1* | 6/2004 | Takeda et al. ............... | 370/349 |
| 2004/0153525 A1* | 8/2004 | Borella ....................... | 709/217 |

OTHER PUBLICATIONS

Omar et al, "An Integrated Platform for Reliable Multicast Support in the Regional Mobile-IP Environment", Mobile Computing and Communications Review, vol. 6, No. 2, Apr. 2002.*
Campbell et al, "Comparison of IP Micromobility Protocols", IEEE, 2002.*
Malki et al, "Low latency Handoffs in Mobile IPv4", Feb. 23, 2001.*
Gustafsson, et al.; Mobile IPv4 Regional Registration; Mobile IP Working Group, Internet Draft; Mar. 1, 2002; pp. 1-37.
Gustafsson, Eva; Jonsson, Annika; Ericsson; Perkins, Charles E.,; Mobile IPv4 Regional Registration draft-ietf-mobileip-reg-tunnel-08.txt, Nov. 22, 2003.

* cited by examiner

*Primary Examiner*—Jungwon Chang
(74) *Attorney, Agent, or Firm*—Valerie M. Davis

(57) ABSTRACT

A registration method in a system having a hierarchical structure (100) that includes a mobile node (20), at least one FA (42), at least one GFA (40) and an HA (30). The method includes the steps of: intercepting (210) a registration request (300) from a mobile node to its HA, the registration request including a first care of address (360) for the mobile node; determining (220) whether there is an existing entry in a visitor list for the mobile node; if the entry exists, updating (230) the entry; if no entry exists, creating an entry (250) in the list for the mobile node, adding (260) a second care of address as an extension to the registration request, and sending (270) the registration request with the address extension to the HA; and sending (240) a registration reply to the mobile node.

14 Claims, 4 Drawing Sheets

REGIONAL REGISTRATION FOR A MOBILE IP ENABLED SYSTEM

This application claims the benefit of U.S. Provisional entitled "REGIONAL REGISTRATION FOR A MOBILE IP ENABLED SYSTEM", Ser. No. 60/525,544, filed Nov. 26, 2003.

FIELD OF THE INVENTION

The present invention relates generally to systems implementing mobile internet protocol ("mobile IP") and more specifically to performing regional registration within mobile IP.

BACKGROUND OF THE INVENTION

Mobile IP is a solution for seamless mobility on a network such as, for instance, the global Internet or a private network, that is scalable, robust and secure, and that allows roaming hosts or "mobile nodes" such as, for instance, radios, phones, laptops, PDAs, etc., to maintain ongoing communications while changing their point of attachment to the network. Specifically, each mobile node is always identified by its home address (regardless of its current point of attachment to the network), which provides information about its point of attachment to a home network. However, when the mobile node is connected to the network outside of its home network, i.e. when visiting a foreign network or a foreign domain, the mobile node is also associated with a care-of address that provides information about its current point of attachment.

Mobile IP provides for a registration process for registering the care-of address with a network entity called a home agent ("HA") whose point of attachment, i.e., its IP address, is in the mobile node's home network. The home agent is a router on the mobile node's home network that tunnels datagrams (also known in the art as data packets) for delivery to the mobile node when it is away from home, and maintains current location information for the mobile node. Registration is what enables the home agent to send the datagrams destined for the mobile node through a tunnel to the care-of address. After arriving at the end of the tunnel, each datagram is then delivered to the mobile node. Registration is typically done via a network entity called a foreign agent ("FA") whose point of attachment is in the visited network and whose IP address is the care-of address for the mobile node. The foreign agent is a router on the mobile node's visited network that provides routing services to the mobile node when registered with the foreign agent. The foreign agent detunnels and delivers datagrams to the mobile node that were tunneled by the mobile node's home agent. For datagrams sent by the mobile node, the foreign agent may serve as a default router for registered mobile nodes.

There are, however, some shortcomings associated with mobile IP, especially given the explosion in the past ten years in the number of mobile nodes attached to the network. One such shortcoming is with respect to the above-mentioned registration process. Namely, when the home agent is several hops away from the mobile node, the roundtrip latency involved in the mobile IP registration process can be significant. Thus, it would be desirable to have a solution that would reduce this latency.

A Mobile IP Working Group of the Internet Engineering Task Force ("IETF") has published a memo describing a regional registration process, i.e., a registration process that is local to the visited network, which addresses the latency in the mobile IP registration process. The regional signaling is performed via a network entity called a gateway foreign agent ("GFA"), which introduces a layer of hierarchy in the visited network that is above that of the foreign agent. Similar to the foreign agent, the gateway foreign agent is also a router on the foreign network. Regional registrations reduce the number of signaling messages to the home agent, and also reduce the signaling delay when a mobile node moves or roams from one foreign agent to another, i.e., changes foreign agents, within the same visited network.

However, a shortcoming of the regional registration approach, as described in the IETF memo, is that it requires changes to the mobile nodes. The mobile node must be aware of the presence of the gateway foreign agent and is, thereby, responsible for sending out regional registration requests to the gateway foreign agent, as well as regular registration requests to its home agent. It is, however, unrealistic to expect all mobile nodes to have support for this regional registration feature. Accordingly, many standard mobile IP, e.g., MIPv4, nodes will not benefit by the presence of the gateway foreign agent.

Thus, there exists a need for a regional registration solution that is compatible with mobile nodes that use a standard mobile IP protocol such as, for instance, MIPv4, and that, accordingly, does not require the mobile node to know about the GFA or the process of regional registration.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
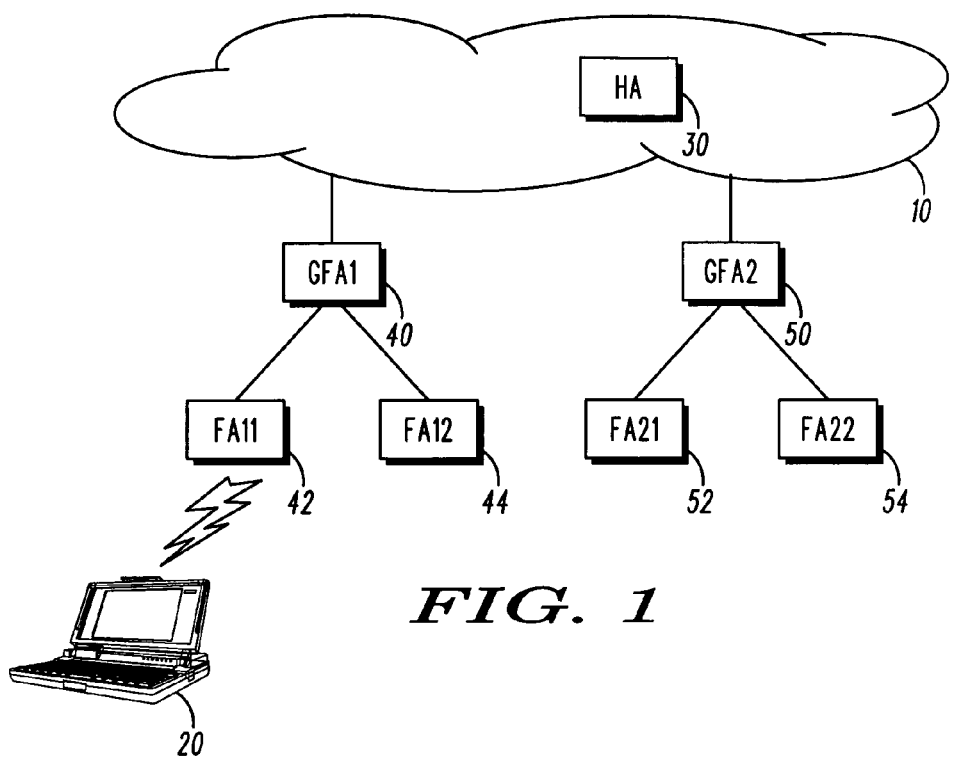
FIG. 1 illustrates a simple block diagram of an exemplary mobility agent hierarchy in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates a simple block diagram of an exemplary mobility agent hierarchy 100 in accordance with an embodiment of the present invention. Illustrated therein is a home network 10 for a mobile node (MN) 20. Mobile node 20 has a home address associated with its home network 10 such that when mobile node 20 is attached to the network in its home network, datagrams can readily reach mobile node 20 using standard mobile IP. Standard mobile IP is defined herein as the implementation of mobile IP in accordance with Request for Comment ("RFC") 3344, i.e., MIPv4.

On the top of hierarchy 100 is a home agent (HA) 30 for mobile node 20 that is also in network 10. Mobile node 20 must register a care-of address with home agent 30 when its point of attachment is in a foreign network (i.e., a network other than network 10) so that home agent 30 may tunnel datagrams destined to mobile node 20 to that care-of address. The next layer of hierarchy 100 includes gateway foreign agents 40 and 50 (i.e., GFA1 and GFA2, respectively). GFA1 and GFA2 are, typically, used to facilitate home registration (i.e., with the home agent) and regional registration in accordance with the present invention. GFA1 has a point of attachment in one foreign network, and GFA2 has a point of attachment in a separate foreign network. These foreign networks may be in the same domain or a different domain from network 10 and from each other. The final layer of hierarchy 100 illustrated in FIG. 1 are foreign agents 42, 44, 52 and 54 (i.e., FA11, FA12, FA21 and FA22, respectively). FA11 and FA12 are on the same network as GFA1 and typically facilitate regional registration with GFA1 in accordance with the present invention. Similarly, FA21 and FA22 are on the same network as GFA2 and typically facilitate regional registration with GFA2 in accordance with the present invention.

FIG. 1 is only representative of the hierarchical structure of the mobility agents for the network, and therefore, shows only a limited number of mobility agents for purposes of ease of illustration. However, it is understood in the art that typically many more mobile nodes are attached to the network. In addition, there are many more local networks and local domains, home agents, gateway foreign agents, and foreign agents attached to the network. Moreover, there may be additional levels in hierarchy 100, e.g. nested foreign agent layers or nested gateway foreign agent layers.

Figure 2:
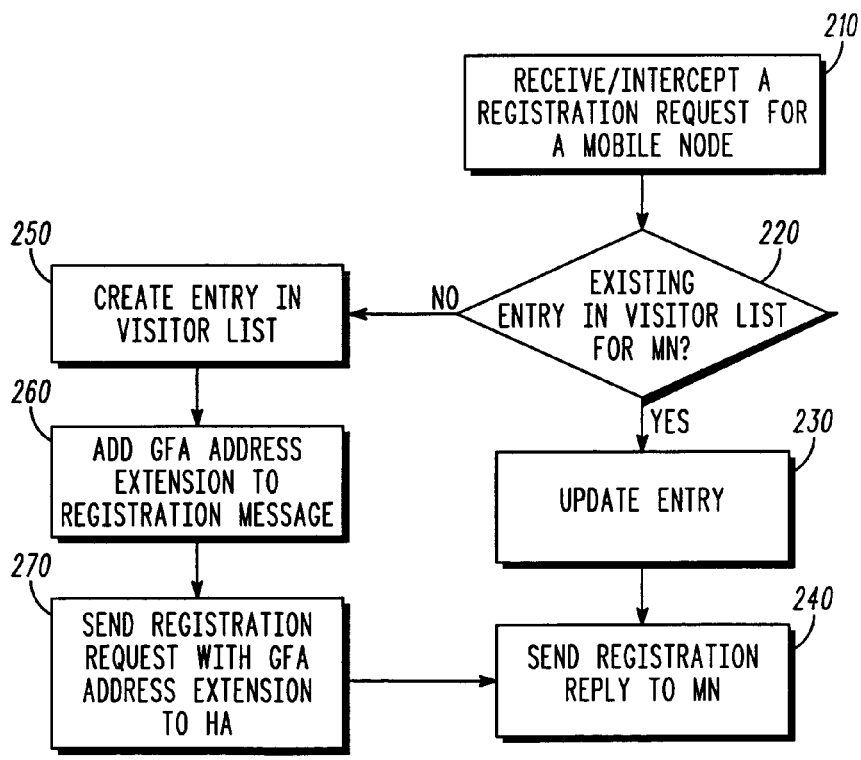
FIG. 2 illustrates a simple flow diagram of the operation of a gateway foreign agent implementing a registration process in accordance with an embodiment of the present invention.

FIG. 2 illustrates a simple flow diagram of the signaling operation of a gateway foreign agent implementing a registration process in accordance with an embodiment of the present invention. First, the GFA intercepts a registration request (210) from a mobile node to its home agent. By intercepting, it is meant that the registration message is sent from the mobile node to its home agent, typically via a foreign agent and thereby having the IP address of the foreign agent as its care-of address, and the foreign agent relays the registration request to the GFA. The GFA then determines whether there is an existing entry in its visitor list (220) for the mobile node. If an entry exists, the GFA updates the entry (230), and sends a registration reply (240) to the mobile node. If no entry exists, the GFA creates an entry in its visitor list (250) for the mobile node, adds its IP address as an extension to the registration request (260), and sends the registration request with the address extension to the mobile node's home agent (270), thereby causing the home agent to record the GFA's IP address as the care-of address for the mobile node. Finally, the GFA relays a registration reply (240) from the home agent to the mobile node, typically via the foreign agent.

Figure 3:
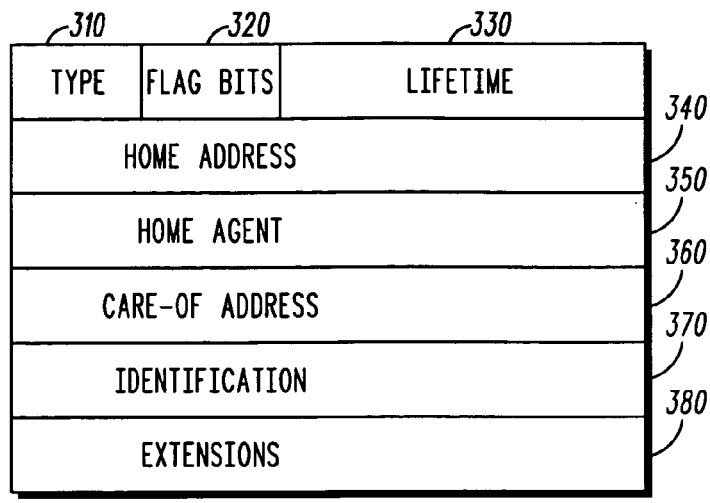
FIG. 3 illustrates an exemplary registration request message in accordance with an embodiment of the present invention.

FIG. 3 illustrates a portion an exemplary registration request message 300 in accordance with an embodiment of the present invention. Registration request 300 has a format and includes fields in accordance with a standard mobile IP registration request. These fields include a type field 310 that identifies the message as either a registration request or a registration reply. A plurality of flag bits 320 that each indicate different instructions to the home agent regarding the tunneling of datagrams to the mobile node. A lifetime field 330 that indicates the number of seconds the mobile node would like the registration to last before it expires. A home address field 340 that contains the IP address of the mobile node. A home agent field 350 that contains the IP address of the mobile node's home agent. A care-of address field 360 that contains the IP address for the end of the tunnel. An identification field 370 used for matching registration requests with registration replies, and one or more extensions 380. One such extension 380 that will be implemented in accordance with the present invention is the GFA address extension. It is understood that registration request 300 illustrates a portion of a typical registration request, and that the registration request includes other potions not illustrated in FIG. 3, including but not limited to, an IP header, a UDP header and a mobile-home authentication extension.

Figure 4:
FIG. 4 illustrates a bounce diagram showing a high level home registration request and reply message sequence with a mobile node's home agent in accordance with the present invention.

FIG. 4 illustrates a bounce diagram showing a high level home registration request and reply message sequence to a mobile node's home agent in accordance with the present invention. Typically, home registration will be implemented when mobile node 20 first enters a foreign network or when the mobile node changes gateway foreign agents. For instance, mobile node 20 may leave its home network 10 and attach to a foreign network near FA11 (FIG. 1), wherein mobile node 20 will typically register a care-of address with home agent 30 so that home agent 30 can tunnel datagrams that are destined to the mobile node's home address. To do this, mobile node 20 sends a registration request 300 to FA11, in accordance with standard mobile IP, wherein the registration message includes its own IP address in the home address field 340, the IP address of FA11 in the care-of address field 360, and the IP address of HA 30 in the home agent address field 350.

Instead of relaying that request to the HA 30, FA11 instead relays the registration request to GFA1. GFA1 adds mobile node 20 to its visitor list and records the IP address of FA11 as the care-of address for mobile node 20. GFA1 then adds its own IP address as an extension 380 to the registration request 300 and relays the request to HA 30. Due to the address extension, HA 30 records the GFA1 IP address as the care-of address for mobile node 20. HA 30 then sends a standard mobile IP registration reply to GFA1, and GFA1 relays this registration reply to mobile node 20 via FA11.

The registration reply typically includes the lifetime value for the regional registration. From the point of view of mobile node 20, GFA1 is transparent, and, accordingly, the registration reply appears to come from its home agent. Thus, mobile node 20 operates as if the registration message sequence was implemented using standard mobile IP. Changes to the foreign agent, gateway foreign agent and home agent, as discussed in detail below, enable the above embodiment of home registration to be implemented.

Figure 5:
FIG. 5 illustrates a bounce diagram showing a high level regional registration request and reply message sequence with a gateway foreign agent in accordance with an embodiment of the present invention.

FIG. 5 illustrates a bounce diagram showing a high level regional registration request and reply message sequence to a gateway foreign agent in accordance with an embodiment of the present invention. Typically, regional registration will be implemented when mobile node 20 changes foreign agents under the same gateway foreign agent. For instance, when mobile node 20 changes from FA11 to FA12 (i.e. moves to a point of attachment closer to FA12 on the network), the mobile node will typically re-register with a different care-of address. To do this, mobile node 20 sends a registration request 300 to FA12, in accordance with standard mobile IP, wherein the registration message includes its own IP address in the home address field 340, the IP address of FA12 in the care-of address field 360, and the IP address of HA 30 in the home agent address field 350.

Instead of relaying that request to the HA 30, FA12 relays the registration request to GFA1. GFA1 updates the IP address of FA12 as the care-of address for mobile node 20. It is unnecessary for GFA1 to relay the registration request to HA30 because HA 30 can continue to use the IP address of GFA1 as the care-of address for mobile node 20. GFA1 then sends a standard mobile IP registration reply to mobile node 20 via FA12. The registration reply typically includes the lifetime value for the regional registration. From the point of view of mobile node 20, the registration reply is from HA 30. Thus again, mobile node 20 operates as if the registration message sequence was implemented using standard mobile IP. Changes to the foreign agent, gateway foreign agent and home agent, as discussed in detail below, enable the above embodiment of regional registration to be implemented.

Figure 6:
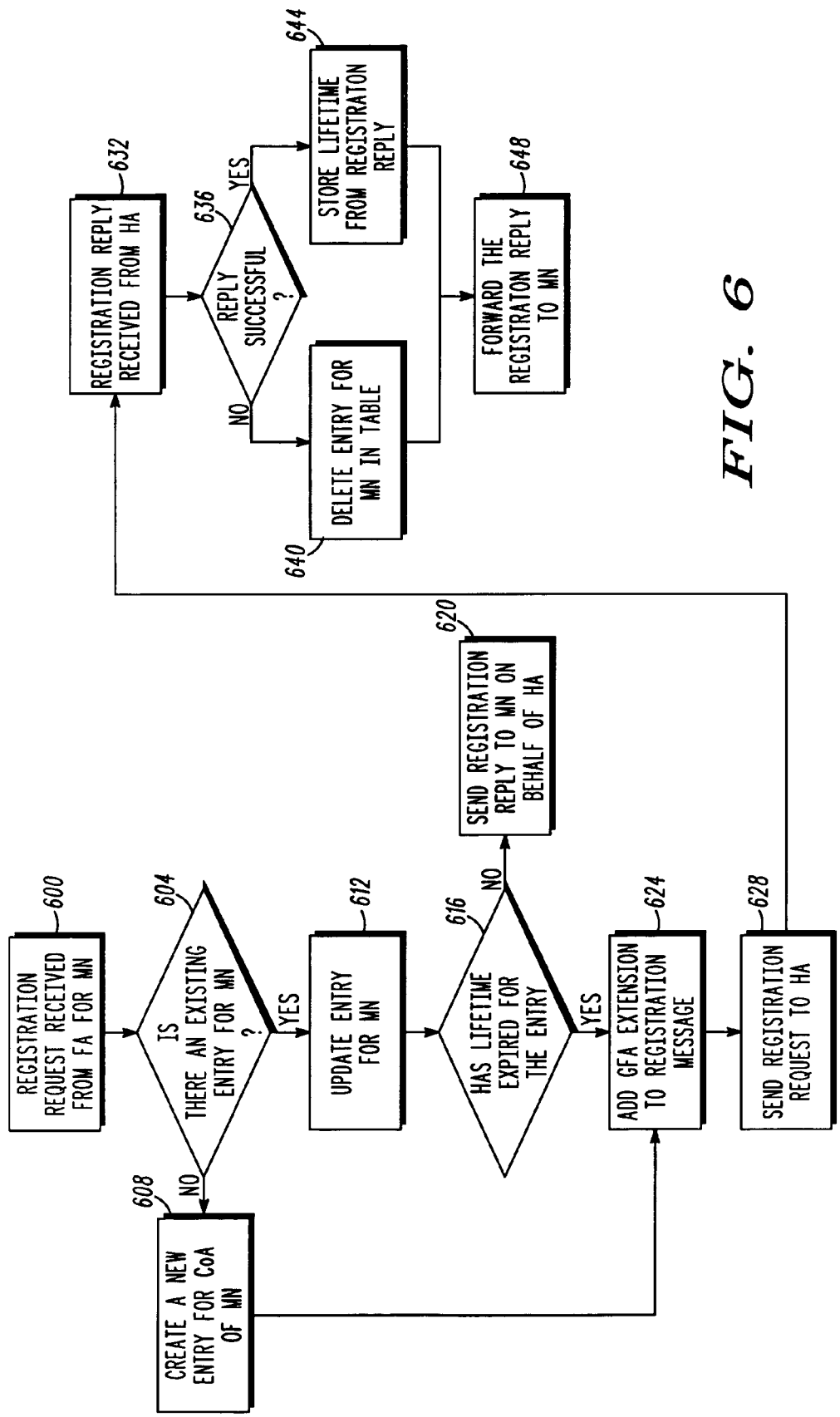
FIG. 6 illustrates a detailed flow diagram of the signaling operation of a gateway foreign agent implementing a registration process in accordance with an embodiment of the present invention.

FIG. 6 illustrates a detailed flow diagram of the signaling operation of a gateway foreign agent implementing a registration process in accordance with an embodiment of the present invention. First, the GFA receives a registration request (600) from an FA for a mobile node. When the mobile node visits the foreign network that includes the GFA, an FA may essentially force the mobile node to register through itself or another foreign agent on the network by setting the 'R' bit in its agent advertisement. The FA advertises at least its own IP address and possibly additional FA IP addresses in accordance with standard mobile IP. Advertising an FA IP address avoids domain ambiguity by enabling the mobile node to use the FA IP address to detect the need for a new care-of address regardless of whether its home network is in the same or a different domain as the visited network. The mobile node will then register through a FA using the FA's care-of address or using a co-located care-of address obtained by the mobile node. For purposes of regional registration, the FA may be aware of the existence of one or more GFA's in any suitable manner. For instance, the FA may have a default GFA that it uses, or it may select the GFA using any number of suitable means known in the art.

Having received the registration request, the GFA determines whether it has an existing entry (604) in its visitor list for the mobile node. If no entry exists for the mobile node, then the GFA has to perform a home registration with the mobile node's home agent. Accordingly, the GFA creates a new entry (608) in its visitor list for the mobile node that includes from the registration request all of the information that an FA must maintain for a pending home agent registration in accordance with standard mobile IP. Moreover, for purposes of regional registration, the GFA must also maintain at least the current care-of address of the mobile node (i.e., the IP address of the foreign agent or a co-located care-of address) and a lifetime value corresponding to the remaining lifetime of the regional registration. The GFA then adds a GFA address extension to the registration request (624) and relays it to the home agent (628). This extension would contain the IP address of the GFA and would cause the HA to record the IP address of the GFA as the care-of address of the mobile node.

Alternately, the GFA could have replaced the IP address in the care-of address field of the registration message with its own IP Address. However, in this embodiment it would also be desirable for the GFA to be configured with a MN-HA shared key for authentication and to maintain a MN-HA security association, in accordance with standard mobile IP. In addition, FA-HA authentication may be applied to the MN-HA extension if necessary, in accordance with standard mobile IP.

Upon receiving a reply from the home agent (632), the GFA determines (636) if the reply indicated that the mobile node successfully registered with its home agent, i.e., determines if the reply was successful. If it was successful, the GFA stores the home registration lifetime value from the registration reply (644) and forwards the registration reply to the mobile node (648). Alternatively, upon receipt of a reply indicating that the mobile node was not successful in registering with its home agent, i.e., an unsuccessful reply, the GFA may delete the entry in its visitor list for the mobile node (640) before forwarding the registration reply to the mobile node.

If the mobile node is already on the visitor list of the GFA, the GFA may not forward the registration request to the HA. It may simply update its entry (612) (e.g., by updating the local care-of address if the mobile node has changed FAs or by resetting the lifetime value corresponding to the mobile node's regional registration lifetime if the mobile node has simply sent a request to refresh its registration). The GFA then determines whether the home registration lifetime has expired for the mobile node (616). If the lifetime for the home registration has not expired, the GFA sends out a registration reply (620) as though the reply is coming from the HA. However, if this lifetime has expired, the GFA performs another home registration for the mobile node by repeating steps 624 through 648.

As indicated above, the GFA must keep track of two lifetime values, the home registration lifetime value corresponding to the lifetime of the mobile node's registration with the home agent and the regional registration lifetime value corresponding to the lifetime of the mobile node's registration with the GFA. With regard to the home agent registration lifetime, the GFA keeps this registration alive by refreshing the home registration on behalf of the mobile node. With regard to the regional registration lifetime, the GFA keeps this registration alive as a function of the mobile node refreshing the regional registration based on the lifetime value sent to the mobile node in the registration reply. Ideally, the GFA may synchronize the two lifetime values by setting both lifetimes to the same value. This would ensure that the GFA sends a registration request to the HA when it receives one from the mobile node and prior to the expiration of the home registration lifetime.

Alternatively, the GFA may opt not synchronize the two lifetimes. Typically, the mobile node will change GFAs less frequently than it changes FAs, and thus, home registration will be required less often than regional registration. Accordingly, the GFA may set the regional registration lifetime to a smaller value than the home registration lifetime to cause the number of home registrations to be less frequent than the number of regional registrations. However, in this case, the failure recovery mechanism described by reference to FIG. 8 below cannot be implemented. To implement this failure recovery mechanism, the HA must at all times have knowledge of the correct FA care-of address recorded during regional registration. However, this is not possible if the care-of address is updated more often (when the regional registration is refreshed) than the home agent could possibly be made aware of this change in care-of address (when the home agent registration is refreshed).

In accordance with the present invention, authentication procedures may be put into place to preserve security associations between all of the entities involved in the registration process. For instance, for registration requests and replies relayed between the FA and the GFA, a two-step authentication procedure may be used, i.e. a standard mobile IP MN-FA authentication extension, and an FA-GFA authentication extension, which is the same as a standard mobile IP FA-FA authentication extension may concurrently be used. However, for systems that provide other conventional means of authentication of mobile nodes such as, for instance, link layer authentication, these authentication extensions may be unnecessary. Moreover, standard mobile IP may be used to provide basic replay protection between the MN and HA. Accordingly, to prevent replay attacks from being launched against the GFA, the GFA must be configured to process the replay protection fields in the registration requests as if it were a standard HA.

Figure 7:
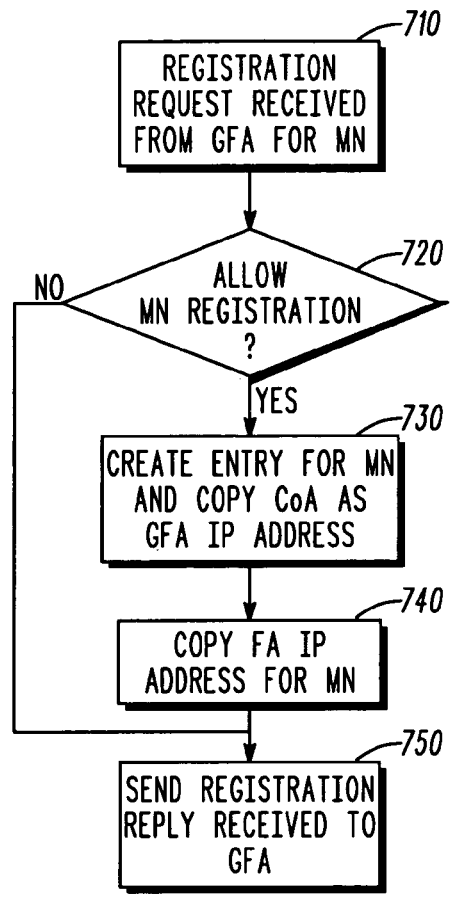
FIG. 7 illustrates a detailed flow diagram of the signaling operation of a home agent implementing a registration process in accordance with an embodiment of the present invention.

FIG. 7 illustrates a detailed flow diagram of the signaling operation of a home agent implementing a registration process in accordance with an embodiment of the present invention. When the HA receives a registration request from a GFA (710), the HA determines if it will allow registration (720) of the mobile node, in accordance with standard mobile IP procedures. If the HA does not allow registration of the mobile node, the HA sends a registration reply (750) to this effect to the GFA that relayed the request. If the HA allows registration of the mobile node, the HA creates a registration entry for the mobile node (730) in accordance with standard mobile IP (730), wherein the HA records the IP address of the GFA in the GFA address extension as the care-of address of the mobile IP. The HA may also optionally record the IP address of the FA (740) that is in the care-of address field of the registration request.

Figure 8:
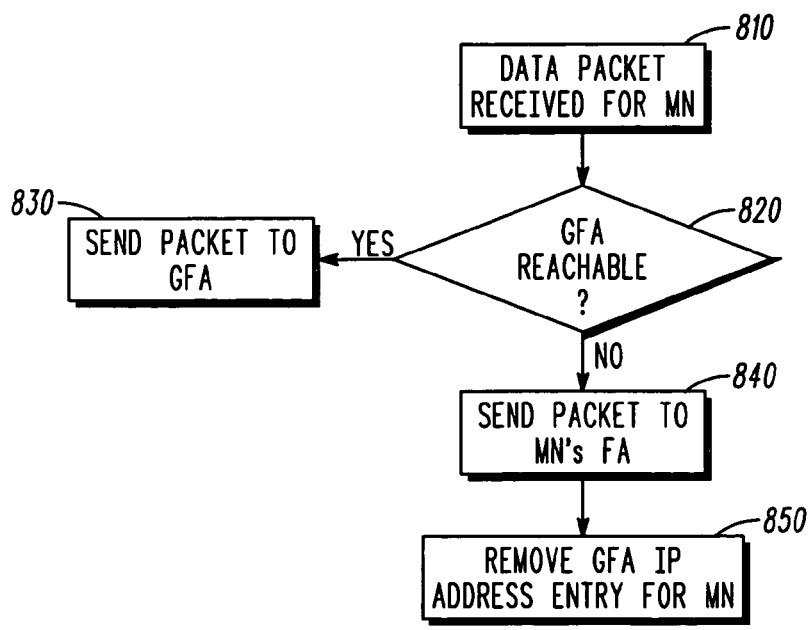
FIG. 8 illustrates a detailed flow diagram of the data processing operation of a home agent implementing a registration process in accordance with an embodiment of the present invention.

FIG. 8 illustrates a detailed flow diagram of the data processing operation of a home agent implementing a registration process in accordance with an embodiment of the present invention. As mentioned above by reference to FIG. 7, the HA may record both the FA care-of address and the GFA care-of address for the mobile node. This enables a failure recovery mechanism to be implemented such as, for instance, in accordance with the flow diagram illustrated in FIG. 8, wherein the HA can periodically query the GFA (whose IP address the HA is using as the mobile node's care-of address), and upon failure of GFA, may begin tunneling data packets to the mobile node using the IP address of the FA that's listed in the care-of address entry on the registration request.

In accordance with this embodiment, when a data packet for a mobile node that is listed with the HA is received (810), the HA may check the reachability or availability of the GFA (820) recorded for that mobile node, i.e., the availability of using the GFA's IP address for tunneling data packets to the mobile node. The HA may detect the reachability of the GFA using any suitable means such as, for instance, checking on some periodic basis and recording the availability information, checking each time it receives a data packet, or detecting a lack of a GFA extension in the registration requests from the mobile node. If the GFA is reachable, the HA tunnels the data packet to the mobile node (830) using the IP address of the GFA as the care-of address. However, if the GFA is not reachable, the GFA tunnels the data packet to the mobile node (840) using the IP address of the corresponding FA as the care-of address, in accordance with standard mobile IP procedures, and removes the IP address of the GFA (850) from the entry for the mobile node. Upon detecting the absence of a GFA extension in the registration request (since the GFA is unavailable), the HA will continue to tunnel data packets to the mobile node, in accordance with standard mobile IP, using the IP address of the FA as the care-of address until it receives a registration request having a valid GFA extension. Thereafter, the HA will update the mobile node entry with the GFA IP address as the care-of address for the mobile node and resume tunneling data packets to the mobile node via this GFA, in accordance with the present invention. A valid GFA extension may, for instance, be the result of the recovery of the GFA or the mobile node changing GFAs.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A registration method for use in a system having a hierarchical structure comprising a mobile node, at least one foreign agent, at least one gateway foreign agent and a home agent, said method comprising the steps of:
   intercepting a registration request from a mobile node to its home agent, said registration request including a first care-of address for said mobile node;
   determining whether there is an existing entry in a visitor list for said mobile node;
   if said entry exists, updating said entry,
   if no entry exists, creating an entry in said list for the mobile node, adding a second care of address as an extension to said registration request, and sending said registration request with said address extension to said home agent;
   sending a registration reply to said mobile node; and
   maintaining in a gateway foreign agent a first and a second lifetime value, wherein said first lifetime value corresponds to the lifetime of a registration by said mobile node with its home agent, and said second lifetime value corresponds to the lifetime of a registration by said mobile node with a gateway foreign agent.

2. The method of claim 1, wherein said first care-of address is the IP address of a foreign agent, which is included in a care-of address entry of said registration request, and said second care-of address is the IP address of a gateway foreign agent.

3. The method of claim 2, wherein said foreign agent selects said gateway foreign agent, and relays said registration request from said mobile node to said gateway foreign agent.

4. The method of claim 1, wherein said registration reply is sent directly to said mobile node from a gateway foreign agent if said entry exists, and said reply is received from said home agent and relayed from the home agent to the mobile node via a gateway foreign agent if no entry exists.

5. The method of claim 4 further comprising the steps of determining whether the reply from the home agent indicates that said mobile node has successfully registered with said home agent and if so storing a lifetime value included in said registration reply, otherwise deleting the entry in said visitor list for said mobile node.

6. The method of claim 4, wherein if an entry exists, said method further comprising the steps of determining whether a lifetime for said registration request has expired and if so adding said second care-of address as an extension to said registration request, and sending said registration request with said address extension to said home agent.

7. The method of claim 1, wherein updating said entry comprises recording said first care-of address.

8. The method of claim 7, wherein said entry is updated as a function of said mobile node roaming from a first foreign agent to a second foreign agent, wherein said first care of address is the IP address of said second foreign agent.

9. The method of claim 1, wherein said first lifetime value is the same as said second lifetime value.

10. The method of claim 1, wherein said first lifetime value is different from said second lifetime value.

11. The method of claim 1, wherein said first care-of address is a co-located care-of address, which is included in a care-of address entry of said registration request, and said second care-of address is the IP address of a gateway foreign agent.

12. The method of claim 1, further comprising removing said second care-of address from said registration entry if said second care-of address is unreachable.

13. The method of claim 12, further comprising:

receiving a subsequent registration message from said mobile node including a valid care-of address added as an extension to said subsequent registration request; and recording said valid care-of address for use in tunneling at least one datagram to said mobile node.

14. A gateway foreign agent included in a system having a hierarchical structure comprising a mobile node, at least one foreign agent, at least one said gateway foreign agent and a home agent, said gateway foreign agent being configured for:

intercepting a registration request from a mobile node to its home agent, said registration request including a first care-of address for said mobile node;

determining whether there is an existing entry in a visitor list for said mobile node;

if said entry exists, updating said entry;

if no entry exists, creating an entry in said list for the mobile node, adding a second care of address as an extension to said registration request, and sending said registration request with said address extension to said home agent;

sending a registration reply to said mobile node; and maintaining in a gateway foreign agent a first and a second lifetime value, wherein said first lifetime value corresponds to the lifetime of a registration by said mobile node with its home agent, and said second lifetime value corresponds to the lifetime of a registration by said mobile node with a gateway foreign agent.

* * * * *